April 23, 1957   J. E. WOODS   2,789,580
MECHANICAL TRANSDUCER WITH EXPANSIBLE CAVITY
Filed Nov. 18, 1953

*INVENTOR.*
JOHN E. WOODS
BY
ATTORNEYS

United States Patent Office 2,789,580
Patented Apr. 23, 1957

2,789,580

MECHANICAL TRANSDUCER WITH EXPANSIBLE CAVITY

John E. Woods, Cohasset, Mass., assignor to Standard-Thomson Corporation, Waltham, Mass., a corporation of Delaware Application November 18, 1953, Serial No. 392,914

5 Claims. (Cl. 137—777)

The present invention relates to mechanical energy transducers, and more particularly to a unit having an extensible metallic sheath adapted to change in dimension in response to changes in an applied pressure.

Such devices have many and varied applications, and are used for purposes of control, for performing useful work, and for transmitting forces remotely. One of the objects of this invention is to provide a unit capable of producing relatively large linear movements of an output member in response to a variation in applied pressure.

In devices ordinarily employed at present for similar purposes the unit is so constructed that it expands dimensionally upon an increase in the applied pressure. A simple example of this is the ordinary hydraulic piston, which moves to expand the volume of the cylinder on the side of the piston head to which the pressure is applied. In many applications, however, it is found that a device having a reverse characteristic is preferable, namely, one that decreases in some dimension upon an increase in the applied pressure. Accordingly, it is a further object of this invention to provide a unit adaptable to fill this need.

A still further object is to provide a structure of inexpensive, uncomplicated design and rugged construction, adapted to withstand great pressures, and having great dependability of performance.

With the above and other objects in view, a principal feature of this invention consists in the combination of an outer extensible metal sheath, adapted to contract laterally upon longitudinal extension thereof, with a deformable lining of one or more parts within the sheath which defines a cavity to which the actuating pressure is applied.

According to this invention, the sheath takes the form of a braided or woven metal tube or a helically wound or wrapped metal strip having the property of decreasing in diameter when longitudinally extended. This property may be advantageously utilized in conjunction with the properties of a deformable outer support forming a part of the lining to permit the insertion into the cavity of a thin, flexible, and relatively weak inner seal, the seal being firmly backed up and supported by the supporting material under all conditions and at all times. The sheath also provides a structure which may be either adapted for decreasing in length with an increase in applied pressure or temperature, or for increasing in length under a similar change in pressure. This adaptation is accomplished by proper adjustment of the pitch of the wrapped, woven, or braided material. There is thus provided a unit which may be provided with a flexible seal to which the pressure is applied, and in which the seal is firmly supported on all sides against the pressure, first by the deformable supporting material, and second, by the surrounding metal sheath which firmly resists the pressure at all points and under all conditions of use.

Another feature of the invention resides in its extreme simplicity of construction, whereby the parts may be easily fabricated and assembled. Moreover, the principle of operation is such that although flexible and deformable elastomeric materials are employed in its construction, these materials are so supported as to eliminate stresses tending to shorten their service life.

Other features comprise certain features of construction, modes of operation, arrangements, and relationships of the parts which will be more clearly understood from the following description, and more specifically defined in the claims.

Figure 1:
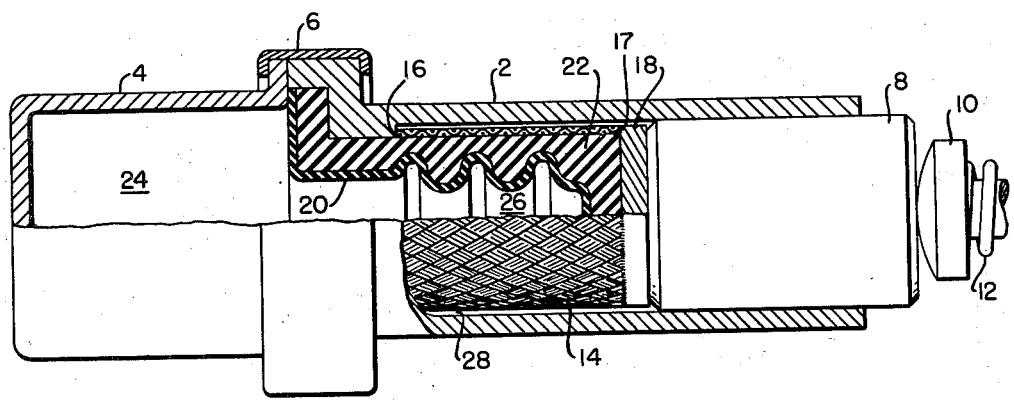
Fig. 1 is an elevation in section of an integrally contained thermostatic unit incorporating the invention.

Referring to the embodiment of Fig. 1, there may be provided a cylindrical metal housing or sleeve 2 which has a flanged end portion adapted to bear against a flange on the open end of a thermal cup 4. The sleeve and cup are securely joined in assembly by a locking sleeve or ring 6 having its ends spun over the flanges on each side.

The sleeve 2 has a central bore adapted to receive a slidable piston 8, the piston being placed in position to bear against a member 10 to be actuated. The bearing pressure is maintained at all times by suitable means, such as a compression spring 12.

Within the bore in the sleeve 2 there is provided a section of cylindrical metal sheathing 14 which, in the illustrated form, consists of woven, helically wound strands, each strand preferably consisting of a number of filaments, either parallel, twisted, or braided to one another. Sheathing of this type is frequently used as a protective covering for multiple-conductor electrical cables. It will be understood that any other suitable sheathing, having properties similar to those of the described embodiment as hereinafter more fully amplified, may also be employed.

The sheathing 14 has one end secured to the sleeve 2 by a weld 16. Soldering or other suitable means may be employed alternatively for this purpose. The other end of the sheathing is free to move within the sleeve, and is similarly secured by a weld 17 to an end fitting or plate 18 adapted to bear upon the piston 8.

Inner flanged portions of the sleeve 2 and cup 4 press against and securely hold the flanged extremity of a deformable lining consisting of an inner flexible seal 20 and a deformable support 22 which completely fills the space between the seal and the sheath. The seal 20 is preferably formed in the shape of a bellows having a closed end and an open end communicating with the space 24 in the thermal cup.

The bellows may be constructed of metal, but in applications requiring greater movement of the piston it is preferable to use an elastomeric material such as rubber or any suitable rubber substitute, fabricated either by the molding or dipping process. The deformable support 22 is preferably fabricated of an elastomeric material and is sustantially incompressible. In the described embodiment, its properties are generally similar to those of the seal, and it will serve as a seal to permit continued use of the device in the event that the seal ruptures. Indeed, the latter may be entirely eliminated by a modification of the structure shown, in which the support 22 is selected to serve as the seal for the thermal material. The seal 20, if used, is preferably fabricated of material principally selected for its sealing properties, whereas the support 22, when used with a separate seal, is selected for the property of easy deformability, with its sealing properties being considered only as a safety feature in the event that the inner seal ruptures.

There is thus provided an outer metal sheath provided with end fittings consisting of the plate 18 on one end, and the sleeve 2 on the other end. Between the ends of the sheathing there is defined a sheath enclosure of variable volume, which may be related mathematically to the pitch and braid angle of the strands, as hereinafter more fully described. In general terms, longitudinal extension of the sheath causes lateral contraction thereof, while longitudinal contraction causes lateral expansion, as is well understood by those familiar with the use of such sheathing in the various arts.

The lining for the sheath, consisting of the seal 20 and the support material 22, defines an inner cavity communicating with the space 24 in the thermal cup. The cavity 26 and space 24 are completely filled with a suitable thermal material, such as liquid or wax. Expansion of the thermal material due to an increase in temperature is compensated for entirely by expansion of the cavity 26. Similarly, contraction of the thermal material produces a reduction in the volume of the cavity.

In operation, an increase in the applied temperature causes longitudinal extension of the bellows seal 20. Since the support material 22 is incompressible, the volume of this material within the sheath enclosure remains invariable. Therefore, the increase in the volume of the cavity causes a corresponding increase in the volume of the sheath enclosure, which means that the pitch of the strands must change sufficiently in the required direction to accomplish this end. Whether this change causes a lengthening or foreshortening of the sheath depends upon the braid angle, as defined below. In either case, the piston 3 follows the movements of the plate 18 and transmits the motion thereof to the member 10.

Figure 4:
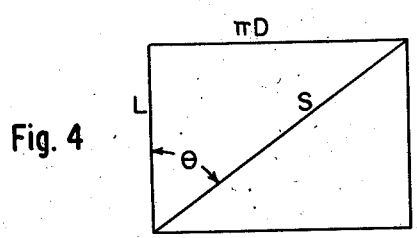
Fig. 4 is a diagram illustrating the relationship between the pitch of the strands in the metal sheathing and the dimensional response of the device to an increase in the applied pressure.

An understanding of the response properties of the sheath according to this invention may be gained by reference to Fig. 4. This is a diagram representing a developed view of a section of the sheath equal in length to one pitch of the strands. The pitch L is the axial length in which a given strand makes a complete turn about the sheath. The braid angle $\theta$ is defined as the angle which the strand makes with a line parallel to the axis and intersecting the strand. It is assumed that all of the strands have the same pitch and braid angle, although of course half of the strands are wrapped in one direction about the sheath while the other half are wrapped in the opposite direction.

Within the assumed range of pressures, each strand is of such stiffness that any strain therein due to tensile stresses is negligible. Moreover, since there are equal numbers of strands wrapped in opposite directions, longitudinal dimensional changes in the sheath do not produce a twisting of one end of the sheath with respect to the other. Therefore, the length S of each strand required to make a complete turn is a constant.

It is first desired to determine the relationship between the volume of a given length of sheath and the braid angle $\theta$. This may be found by determination first of the volume V of the illustrated developed section having unit pitch length. The actual volume is then found by multiplying this result by the actual number or fraction of pitch lengths in the given sheath. The latter number is constant for all possible positions of a given sheath. Accordingly, we have (1) $$V = \frac{\pi D^2 L}{4} = \frac{L(S^2 - L^2)}{4\pi}$$

where D is the diameter of the sheath. Using the relationship (2) $$L = S \cos \theta$$

the relationship of volume to braid angle is found to be (3) $$V = \frac{S^3 \cos \theta \sin^2 \theta}{4\pi}$$

It is of particular interest to determine whether a given change in the braid angle produces an increase or decrease in the volume. Differentiating Equation 3, we have (4) $$\frac{dv}{d\theta} = \frac{S^3 \sin \theta}{4\pi}(3 \cos^2 \theta - 1)$$

from which it is seen that an increase in volume may be accompanied either by an increase or decrease in the braid angle, depending upon the sign of the quantity in parentheses. By equating this quantity to zero, we find (5) $$\theta = \cos^{-1}\frac{1}{\sqrt{3}}$$

which is an angle between 54° and 55°, termed the "critical angle" for the braid.

Examination of Equations 4 and 5 reveals that for braid angles of less than the critical value, an increase in the volume is accompanied by an increase in the braid angle, and a foreshortening of the sheath as shown by Equation 2. Conversely, for braid angles greater than the critical angle, an increase in the volume is accompanied by a decrease in the braid angle and a lengthening of the sheath. If the braid angle is at the critical value, the volume is at its maximum and cannot be further increased. Upon further increases in pressure, the sheath acts like a rigid tube, and will eventually burst if the strength of the strands is exceeded.

It will therefore be clear that if it is desired to have the device extend in length upon an increase in the applied pressure, the braided sheath is fabricated so that the initial braid angle is greater than the critical value. Conversely, if it is desired to have the unit foreshorten in length upon an increase in the applied pressure, the sheath is fabricated with an initial braid angle of less than the critical value. In the former case, it is apparent that the sheath may fit closely to the walls of the sleeve 2 when no internal pressure is applied, since any increase in the pressure causes a lateral contraction of the sheath. However, in the latter case an initial annular clearance 28 is necessary, since an increase in the applied pressure causes lateral expansion of the sheath.

It will be understood that although the embodiment of Fig. 1 uses an integrally contained thermal cup, it is also possible to operate the device by connecting it to a remote thermal bulb or mechanically actuated pressure source, through a capillary tube in a conventional manner.

Figure 2:
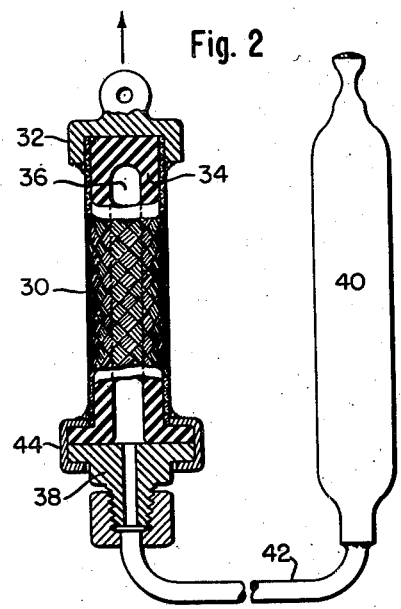
Fig. 2 is an elevation in section of a second embodiment adapted to foreshorten upon an increase in the pressure applied from a remote source.

Fig. 2 illustrates a second embodiment of the invention, in which the initial braid angle is less than the critical value to cause it to foreshorten in length upon an increase in the applied pressure. The woven sheath 30, which may be similar in construction to that of Fig. 1, is secured by welding or any other suitable means to an end fitting 32. Within the sheath there is received a deformable lining 34 of elastomeric material having a central cylindrical hole or cavity 36. The cavity communicates, through a hole in an end fitting 38, with any suitable remote source of pressure such as a thermal bulb 40, through a capillary tube 42. The braid is secured by a weld to a locking ring 44, which is spun over the fitting 38 so as to clamp the lining 34 firmly against the inner face of the fitting 38.

The arrow represents a nominal force applied to the unit by any suitable external means such as a tension spring, whereby the unit is placed under a normal tension. When the internal applied pressure becomes sufficiently great to overcome this nominal force, the unit foreshortens, as above indicated.

It is possible to fabricate a device according to this invention which is similar to that of Fig. 2, and which simply incorporates the transducer into one end of the communicating sheath as an integral part thereof. By this means, the entire longitudinal variation which is produced by the variation in the applied pressure takes place in the portion of the sheath between the end fittings corresponding to the parts 32 and 38 of Fig. 2.

Figure 3:
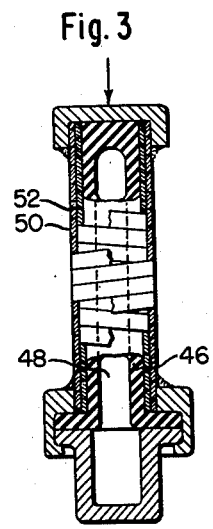
Fig. 3 is an elevation in section of a thermal unit having multiple layers of wound metal sheathing.

Fig. 3 illustrates an integrally contained thermal unit having an elastomeric lining 46 similar to that of Fig. 2, defining a cavity 48 communicating with a thermal cup. In this case, the woven metal sheath is replaced by two adjacent, oppositely wound layers 50 and 52, each layer consisting of a helically wrapped metal strip. In the embodiment shown, each layer is formed by wrapping a single strip, but multiple strips may also be used. (Indeed, the woven metal sheath of Figs. 1 or 2 may be thought of as comprising two layers, each having multiple strands, in which the respective strands have been woven together.) It is also possible to have more than two layers of strips, or only a single layer. In place of the strip, it is also possible to use material having other cross-sections, such as round, square or oblong.

In the alternative constructions of Figs. 2 and 3, the principle of operation is essentially similar to that developed above with reference to Figs. 1 and 4. In construction, due regard should be had for the direction and degree of response which must be accommodated by the sheath. Thus, if the sheath of Fig. 3 is to be elongated upon an increase in the applied pressure, the strip may have a short pitch and the turns may be wrapped closely together under initial conditions, as shown in the drawing. However, if the device is to be foreshortened, the turns are preferably spaced somewhat under initial conditions, and the pitch is initially greater than that illustrated. If a single strip is used for each layer under the latter conditions, it is preferably fabricated of relatively wide stock, or, alternatively, the layer may be formed of narrower, multiple parallel strips.

It should be noted that an important function of the sheath is to support the lining when pressure is applied. This pressure may be far in excess of that which the lining can inherently withstand without ballooning and bursting. Accordingly, it is desirable to reduce the gaps between the strips of the sheath so as to prevent extrusion of the lining material therethrough. This constitutes one reason for using multiple layers of strips in preference to a single layer for certain types of actuators.

Another reason for using multiple layers of strips is that in certain cases in which a single layer is used the pressure may reach values at which the device tends to twist as well as to elongate or contract longitudinally. This effect is ordinarily undesirable, and in each of the described embodiments it is overcome by providing equal numbers of oppositely wound strands or strips having the same pitch.

As shown by Figs. 2 and 3, the lining 34 or 46 may comprise a single element, and may be of simple cylindrical shape. However, as shown by Fig. 1, it is also possible to substitute a separate flexible seal and a surrounding deformable support for the lining. In the latter case, the seal may be of simple cylindrical shape, or it may take the form of a bellows as shown in Fig. 1, or any other convenient shape. For many applications, the bellows form is preferred, since for a bellows volumetric expansion occurs through longitudinal extension rather than through radial stretching. It has been found that rubber or rubber-like materials, while held under stress, decompose both physically and chemically more rapidly than while not under stress, hence, a rubber bellows would have longer life under similar pressure conditions than a ballooning rubber cylinder.

It will be understood that many variations of form, design, and arrangement may be incorporated into the described embodiments without departing from the spirit or scope of the invention. Some of these variations are indicated above, while others will occur to those skilled in the art in meeting the demands of particular applications through the application of known principles and procedures, in the light of the teachings herein.

Having thus described the invention, I claim:

1. A mechanical transducer having the combination of an extensible sheath formed of helically wound metallic elements, said elements being adapted to contract laterally when longitudinally extended, end fittings for the sheath to define a sheath enclosure, a flexible seal within the enclosure defining a cavity having connection with a source of pressure, a deformable support for the seal filling the space between the seal and sheath, means to apply pressure to the cavity to vary its volume, said variation causing longitudinal adjustment of the sheath to produce a corresponding change in the volume of said enclosure, and movable actuator means in engagement with one of said fittings.

2. A mechanical transducer having the combination of an extensible sheath formed of helically wound metallic elements, said elements being adapted to contract laterally when longitudinally extended, end fittings for the sheath to define a sheath enclosure, a corrugated elastomeric bellows within the enclosure having a closed end and an open end provided with connection to a source of pressure, a deformable support for the bellows filling the space between the seal and sheath, means to apply pressure to the bellows to vary its volume, said variation causing longitudinal adjustment of the sheath to produce a corresponding change in the volume of said enclosure, and movable actuator means in engagement with one of said fittings.

3. A mechanical transducer having the combination of an extensible sheath formed of helically wound metallic elements, said elements being adapted to contract laterally when longitudinally extended, end fittings for the sheath to define a sheath enclosure, a thin-walled flexible seal within the enclosure defining a cavity having connection with a source of pressure, a substantially incompressible, deformable support for the seal filling the space between the seal and sheath, means to apply pressure to the cavity to vary its volume without appreciable stretching of the seal, said variation causing longitudinal adjustment of the sheath to produce a corresponding change in the volume of said enclosure, and movable actuator means in engagement with one of said fittings.

4. A mechanical transducer having the combination of an extensible sheath formed of oppositely wound woven helical metallic strands, said strands being adapted to contract laterally when longitudinally extended, end fittings for the sheath to define a sheath enclosure, a flexible seal within the enclosure defining a cavity having connection with a source of pressure, a deformable support for the seal filling the space between the seal and sheath, means to apply pressure to the cavity to vary its volume, said variation causing longitudinal adjustment of the sheath to produce a corresponding change in the volume of said enclosure, and movable actuator means in engagement with one of said fittings.

5. A mechanical transducer having the combination of an extensible sheath formed of a number of layers of helically wound metallic strands, the layers having alternate directions of winding and being adapted to contract laterally when longitudinally extended, end fittings for the sheath to define a sheath enclosure, a flexible seal within the enclosure defining a cavity having connection with a source of pressure, a deformable support for the seal filling the space between the seal and sheath, means to apply pressure to the cavity to vary its volume, said variation causing longitudinal adjustment of the sheath to produce a corresponding change in the volume of said enclosure, and movable actuator means in engagement with one of said fittings.

(References on following page)

References Cited in the file of this patent

UNITED STATES PATENTS

| | | |
|---|---|---|
| 1,726,957 | Hughes | Sept. 3, 1929 |
| 2,365,063 | Downey | Dec. 12, 1944 |
| 2,642,091 | Morin | June 16, 1953 |

FOREIGN PATENTS

| | | |
|---|---|---|
| 426,594 | Great Britain | Apr. 5, 1935 |
| 565,833 | Great Britain | Nov. 30, 1944 |